(12) United States Patent
Duarte Cardoso et al.

(10) Patent No.: US 11,048,540 B2
(45) Date of Patent: Jun. 29, 2021

(54) METHODS AND APPARATUS TO MANAGE HEAT IN A CENTRAL PROCESSING UNIT

(71) Applicant: Intel Corporation, Santa Clara, CA (US)

(72) Inventors: Igor Duarte Cardoso, Shannon (IE); John OLoughlin, Shannon (IE); Louise Daly, Shannon (IE); Abdul Halim, Limerick (IE); Adrian Hoban, Limerick (IE)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 16/023,933

(22) Filed: Jun. 29, 2018

(65) Prior Publication Data

US 2019/0042330 A1    Feb. 7, 2019

(51) Int. Cl.

| | |
|---|---|
| *G06F 9/455* | (2018.01) |
| *G06F 9/50* | (2006.01) |
| *G06F 1/20* | (2006.01) |
| *G06F 1/329* | (2019.01) |
| *G06F 1/26* | (2006.01) |
| *G06F 9/48* | (2006.01) |
| *G06F 1/3293* | (2019.01) |
| *G06F 1/3225* | (2019.01) |

(52) U.S. Cl.
CPC .......... *G06F 9/45558* (2013.01); *G06F 1/206* (2013.01); *G06F 1/329* (2013.01); *G06F 9/5094* (2013.01); *G06F 1/26* (2013.01); *G06F 1/3225* (2013.01); *G06F 1/3293* (2013.01); *G06F 9/4856* (2013.01); *G06F 9/5027* (2013.01); *G06F 9/5088* (2013.01); *G06F 2009/4557* (2013.01); *G06F 2009/45583* (2013.01); *G06F 2009/45591* (2013.01)

(58) Field of Classification Search
CPC ........ G06F 9/4856; G06F 1/26; G06F 9/5088; G06F 9/45558; G06F 1/206; G06F 1/3225; G06F 1/3293; G06F 9/5027; G06F 1/329; G06F 9/5094; G06F 2009/4557; G06F 2009/45583; G06F 2009/45591
USPC ................................. 713/300, 1, 100; 718/1
See application file for complete search history.

(56) References Cited

U.S. PATENT DOCUMENTS

| | | | |
|---|---|---|---|
| 7,802,073 B1 * | 9/2010 | Cheng ................... | G06F 9/3851 712/10 |
| 9,588,577 B2 * | 3/2017 | Ahn ........................ | G06F 1/324 |

(Continued)

*Primary Examiner* — Ji H Bae
(74) *Attorney, Agent, or Firm* — Hanley, Flight & Zimmerman, LLC (57) ABSTRACT

Methods, apparatus, systems, and articles of manufacture to manage heat in a CPU are disclosed. An example apparatus includes a metric collection agent to output a metric representative of a property of the central processor unit including a first core and a second physical core, the first physical core and the second physical core mapped to first and second logical cores by a map. A policy processor is to evaluate the first metric to determine whether to change the map to remap at least one of the first and second logical cores relative to the second one of the first and the second physical cores to move a process between the first and second physical cores to adjust the property, the moving of the process between the physical cores being transparent to an application/OS layer. A mapping controller is responsive to the policy processor to change the map.

18 Claims, 8 Drawing Sheets

(56) References Cited

U.S. PATENT DOCUMENTS

| | | | |
|---|---|---|---|
| 2006/0095913 A1* | 5/2006 | Bodas | G06F 9/5027 718/100 |
| 2008/0235700 A1* | 9/2008 | Iguchi | G06F 9/5077 718/104 |
| 2009/0288092 A1* | 11/2009 | Yamaoka | G06F 9/5033 718/104 |
| 2011/0088041 A1* | 4/2011 | Alameldeen | G06F 9/505 718/105 |
| 2012/0266179 A1* | 10/2012 | Osborn | G06F 9/5077 718/105 |
| 2013/0067132 A1* | 3/2013 | Guddeti | G06F 13/24 710/260 |
| 2016/0065723 A1* | 3/2016 | Jung | G08B 21/182 340/586 |
| 2016/0252943 A1* | 9/2016 | Varma | G06F 15/00 713/310 |
| 2017/0308151 A1* | 10/2017 | Zhang | G06F 1/3284 |

* cited by examiner

METHODS AND APPARATUS TO MANAGE HEAT IN A CENTRAL PROCESSING UNIT

FIELD OF THE DISCLOSURE

This disclosure relates generally to processor heat management, and, more particularly, to methods and apparatus to manage heat in a central processing unit (CPU).

BACKGROUND

When a processor is executing instructions, heat is generated. Traditionally, heat from a processor is dissipated using a heat sink and/or, in some cases, a fan. When heat is not dissipated evenly, such heat can cause damage to the processor(s).

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

In existing computing systems, a host operating system scheduler attempts to load-balance processor workload across cores in a CPU package and, in some cases, across CPU packages in a multi-socket system. In addition, existing computing systems utilize load-balancer functionality operating in the I/O subsystem to distribute interrupt driven workload(s) to the appropriate CPU package. The intention of this load balancing efforts was to extract the maximum performance from the processor. When a processor executes instructions, some energy is dissipated as heat. Traditionally, such heat was distributed via a heat sink and/or a fan. However, in multicore CPU systems, such heat may be concentrated at the physical location of a single core, resulting in uneven heat dissipation. Such uneven heat dissipation results in particular portions of the physical processor being exposed to increased heat levels, which may result in damage to that particular portion. In some examples, the excess heat may result in total failure of the processor and/or core, and or may decrease the expected operational lifespan of the processor and/or core.

Existing approaches for distributing workloads in a processor do not account for the techniques necessary to extract suitable run-time behavior characteristics for data plane intensive applications. For example, with deployment models for network function virtualization (NFV) and low-latency 5G applications, the lack of predictability in terms of performance introduced by host schedulers resulting in these high-performance applications typically choosing to pin workloads explicitly to particular cores and to pin interrupts from I/O devices to the same cores. Consequently, the static hot spot effect, where a portion of a CPU is operated at an increased temperature, may be far more noticeable than in the absence of such pinning.

In example approaches disclosed herein, a wear level of a CPU is dynamically balanced to even out the hot spots associated with core pinning and core isolation. Example approaches for such dynamic balancing can be implemented in hardware, software, and/or a combination thereof by utilizing a Metric Collection Agent that gathers CPU metrics (e.g. temperature per core) and a Wear Level Agent that provides a layer of abstraction of the physical cores by using intermediary mappings between logical cores (to which processes are pinned by a kernel) and physical cores of a hardware processor. By analyzing the metrics reported by the Metric Collection Agent, the Wear Level Agent can dynamically map an abstracted CPU core to a less utilized physical core. This mapping is transparent to the processes executed by the processor (and also transparent to virtual machines (VMs) and/or Containers).

Example approaches disclosed herein reduce the effects of hot-spotting on a CPU which, in turn, results in efficient CPU cooling. Because CPU cooling is made more efficient, advantages in reduced noise levels and/or power savings are achieved. Moreover, in some examples (e.g., fan-less applications), heat dissipation is more efficient, thereby reducing the chances of unexpected hardware failures (e.g., due to uneven workload distribution and corresponding uneven heating across the CPU cores).

Figure 1:
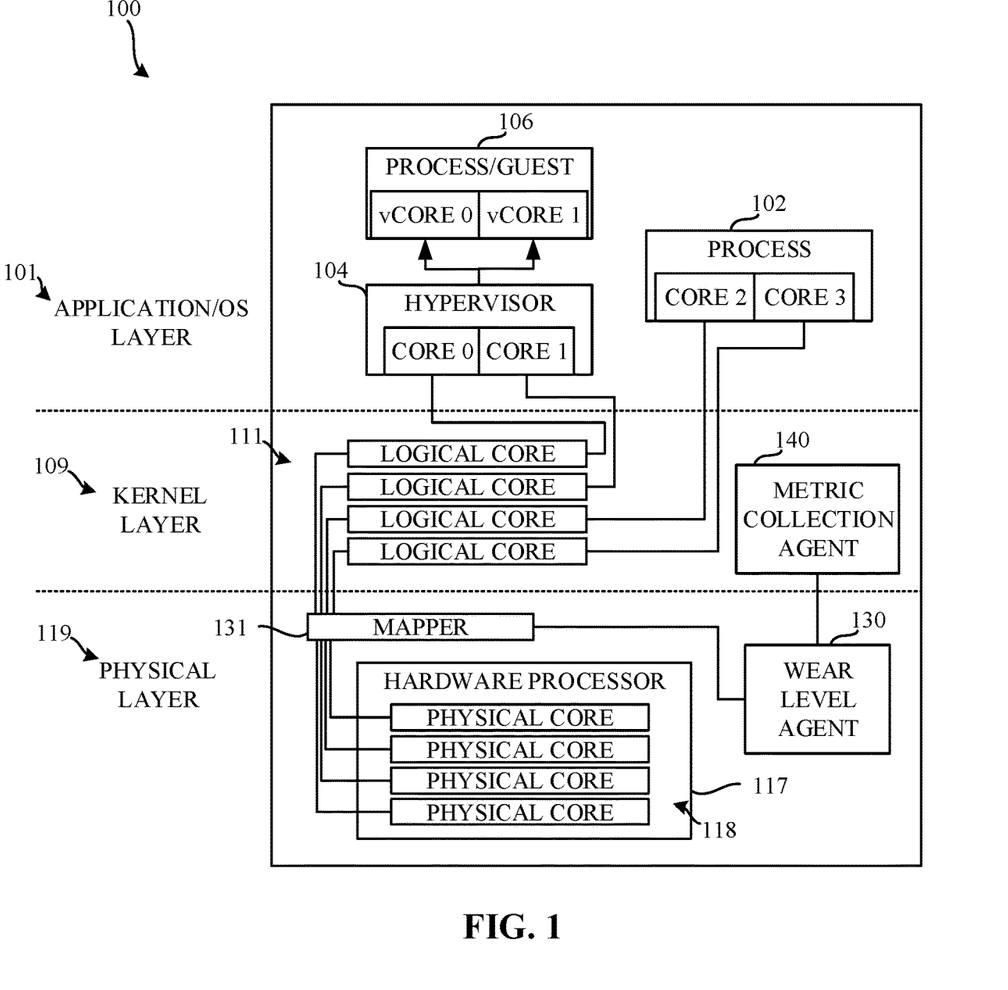
FIG. 1 is a block diagram of an example host constructed in accordance with teachings of this disclosure, where a wear level agent is implemented at a physical layer of the host.
Figure 1A:
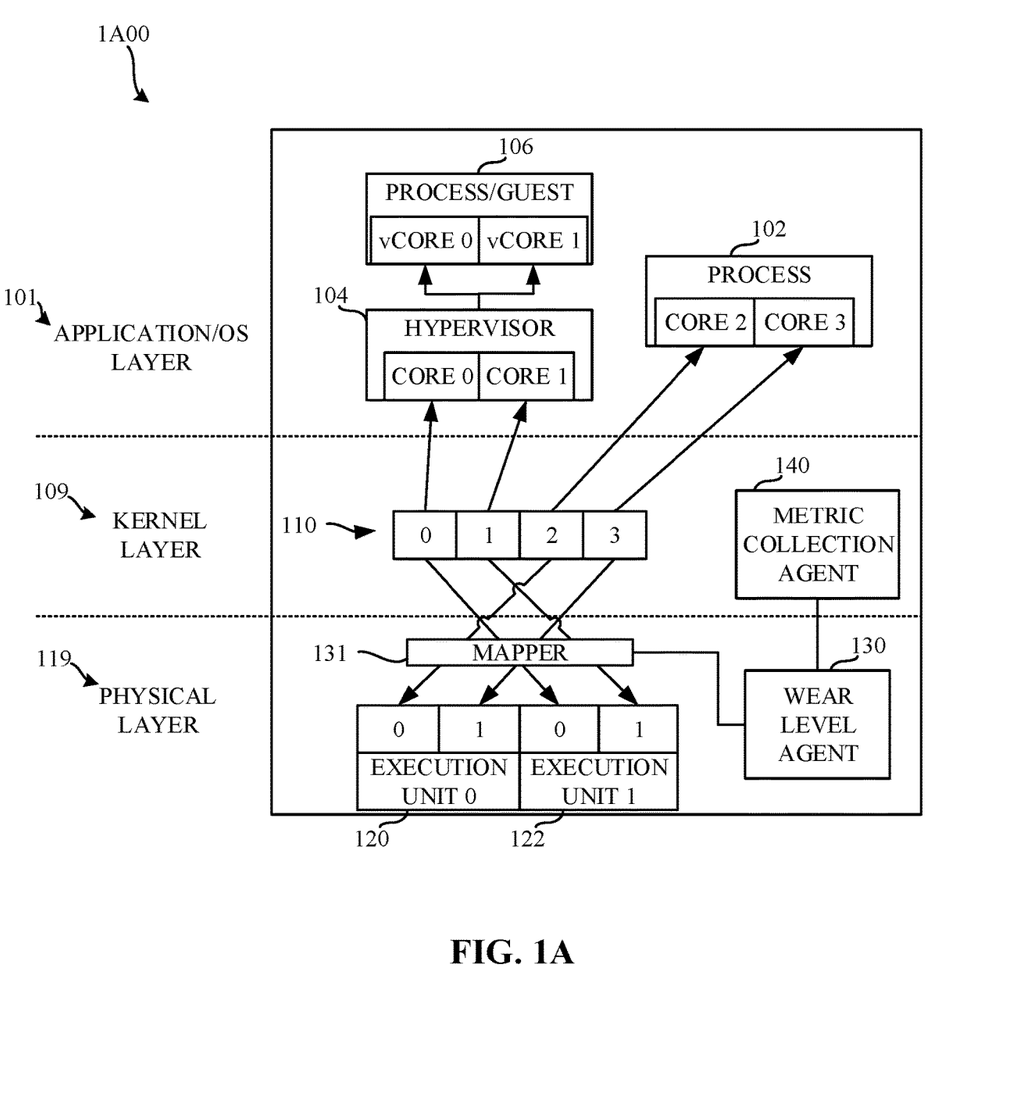
FIG. 1A is an alternative representation of the example block diagram of FIG. 1.

FIG. 1 is a block diagram of an example host 100 constructed in accordance with teachings of this disclosure. In this example, a wear level agent 130 is implemented at a physical layer of the host 100. FIG. 1A is an alternative representation of the example block diagram of FIG. 1. The example host 100 of the illustrated example of FIG. 1 includes a process 102 executed at an application/operating system (OS) layer 101. In the illustrated example of FIG. 1, a hypervisor 104 (executed at the application/OS layer 101) executes processes and/or a guest OS 106. In the illustrated example of FIG. 1, a kernel layer 109 implements a representation of logical cores 111 and a metric collection agent 140. In the illustrated example of FIG. 1, a physical layer 119 includes a hardware processor 117 that includes physical cores 118. The example physical layer 119 of FIG. 1 also includes a wear level agent 130 and a mapper 131. In some examples, the metric collection agent 140 may be implemented at the physical layer 119, instead of the kernel layer 109. The example wear level agent 130 interacts with the mapper 131 to enable dynamic mapping of processes from the logical cores 111 at the kernel layer 109 to physical cores 118 at the physical layer 119. The wear level agent 130 of this example is implemented by hardware circuitry (e.g., application specific integrated circuit(s) (ASIC(s)), programmable logic device(s) (PLD(s)), field programmable logic device(s) (FPLD(s)), digital signal processor(s) (DSP(s)), etc.) and is, thus, present in the physical layer 119.

The example process 102 and/or the example hypervisor 104 of the illustrated example of FIG. 1 are implemented at the application/OS layer 101. In examples disclosed herein, the process 102 and/or the example hypervisor 104 represent application(s) executed by the host device. The example hypervisor 104 provides an execution environment for the example process and/or guest OS 106. In some examples, the application/OS layer is also referred to as user space.

The example kernel layer 109 of the illustrated example of FIG. 1 represents instructions that provide a user space execution environment. In the illustrated example of FIG. 1A, the example logical cores 111 of FIG. 1 are represented by a process allocation table 110 that maps processes to one or more physical execution unit(s) (and/or cores within the physical execution unit(s)). In existing systems, such mapping within the kernel is static, and does not allow for a changing of the kernel view of the physical cores or the enumeration (e.g., ordered numbering) of the physical cores. In existing systems, when a process is initialized, it can be pinned to (e.g., statically associated with) a logical core, which is then mapped to a physical execution unit. That pinning will not change while the process is running. It may change if the process is terminated, re-initialized, and/or another pinning/affinity request is made.

In examples disclosed herein, an intermediate mapping between the physical cores and the logical cores is important because, from the perspective of the kernel and/or the processes running on top of it, there is no change in the (logical) cores being used after a process has been pinned (e.g., allocated for execution to a logical core). However, the mapping between the logical core and the actual physical core can dynamically change based on an open set of circumstances and criteria. In other words, while the mapping between process(es) and logical cores is static, the mapping between the logical core(s) and the physical core(s) is dynamic. The workload can thus shift from one physical core to another, with no visibility above the wear level agent (e.g., with no visibility in the application/OS layer or applications executing therein). The process will be unaware of a change to a different physical core. In other words, the dynamic mapping of logical core(s) to physical core(s) is transparent to the OS and applications executed on the OS.

The example hardware processor 117 of FIG. 1 is represented as two execution units 120, 122 in FIG. 1A. In the illustrated example of FIG. 1A, each of the execution units includes two cores (numbered with a 0 or a 1). However, any number of execution units may additionally or alternatively be used. Moreover, the execution units may have any number of cores. In some examples, non-symmetric execution units are used, such that one execution unit may have a different number of cores than another execution unit. Moreover, while in the illustrated examples of FIGS. 1 and 1A, a single hardware processor is shown, in some examples, multiple different hardware processors may be used.

In the illustrated example of FIG. 1, the wear level agent 130 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. An example approach for implementing the example wear level agent 130 is shown in further detail below in connection with FIG. 4. While in the illustrated example of FIG. 1 the example wear level agent 130 is implemented using hardware, in some examples, the example wear level agent 130 may be implemented by instructions to be executed by such hardware. An example approach to implementing the example wear level agent 130 as instructions is shown in the illustrated example of FIG. 2.

The example wear level agent 130 of this example can change the mapping of the physical cores by, for example, remapping the kernel view, and/or instructing a hardware mapper (e.g., mapper 131) to change the kernel mapping. As a result, items within the example application/OS layer 101 (e.g., processes and/or hypervisors) have no visibility to the changes in core mappings. In some examples, the hardware (e.g., the wear level agent 130) is to transfer low level state information from a source core to a destination core during the remapping event. Such low level state information may include, for example, register values, register addresses, etc.

In examples disclosed herein, a policy is utilized to control operations of the wear level agent 130. The example policy can be used to simply enable/disable the wear level agent 130, and/or to configure exactly what triggers balancing of a workload (remapping of the cores) and/or when such mapping occurs.

The example metric collection agent 140 of the illustrated example of FIG. 1 is implemented by instructions which, when executed (e.g., by one or more of the execution units 120, 122), collect metrics from the physical layer 119. While the example metric collection agent 140 of the illustrated example of FIG. 1 is shown as implemented at the kernel layer 109, in some examples, the example metric collection agent 140 includes a control-plane application outside the kernel. In some other examples, the metric collection agent 140 is implemented at the physical layer 119 (e.g., as hardware). For example, the CPU itself could have access to such metric information and may use that information to influence the wear level agent. In examples disclosed herein, the metrics collected by the example metric collection agent 140 include temperature readings corresponding to respective ones of the cores within the execution units 120, 122. However, any other metrics may additionally or alternatively be used such as, for example, voltage levels, frequencies, etc.

Figure 2:
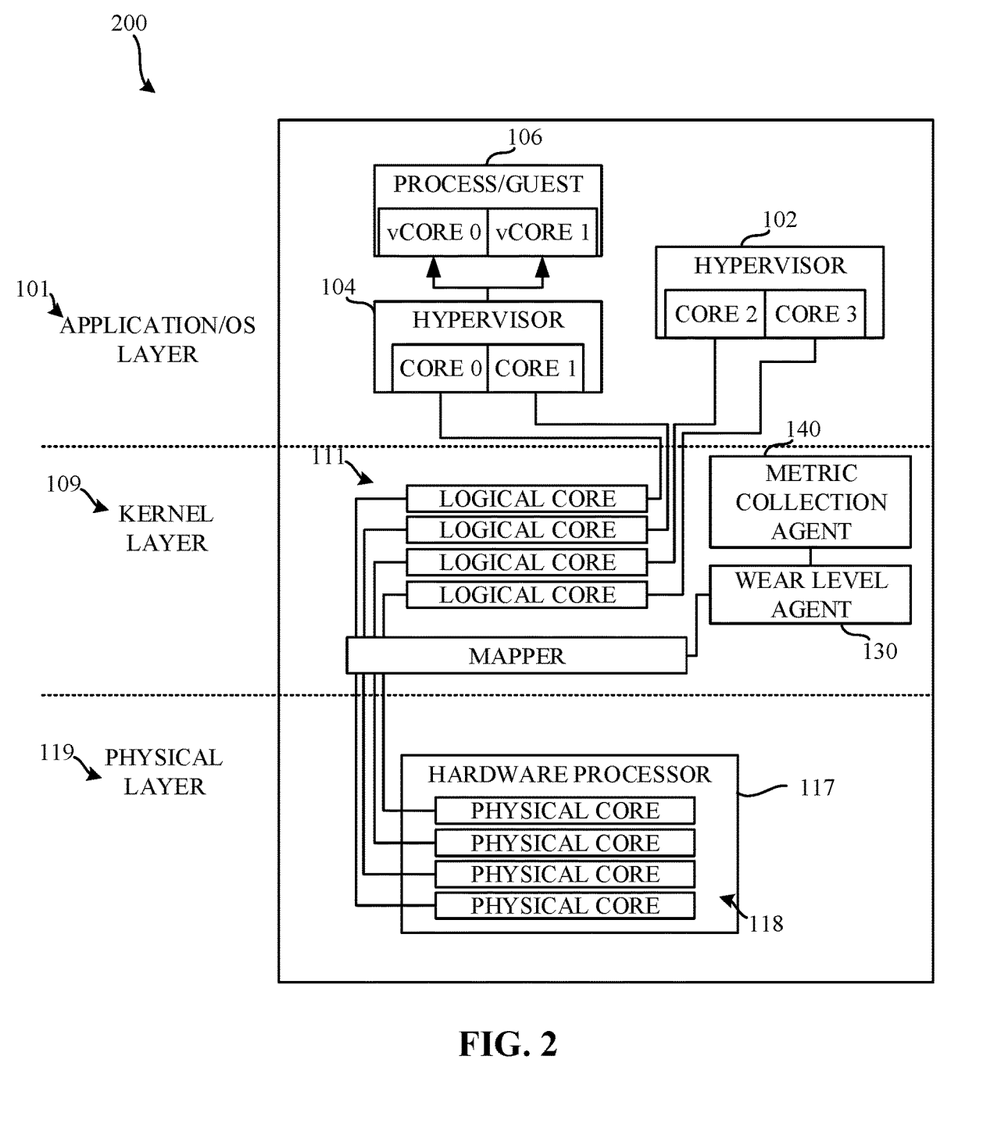
FIG. 2 is a block diagram of an example host system constructed in accordance with teachings of this disclosure, where the example wear level agent is implemented at the kernel layer of the host.
Figure 2A:
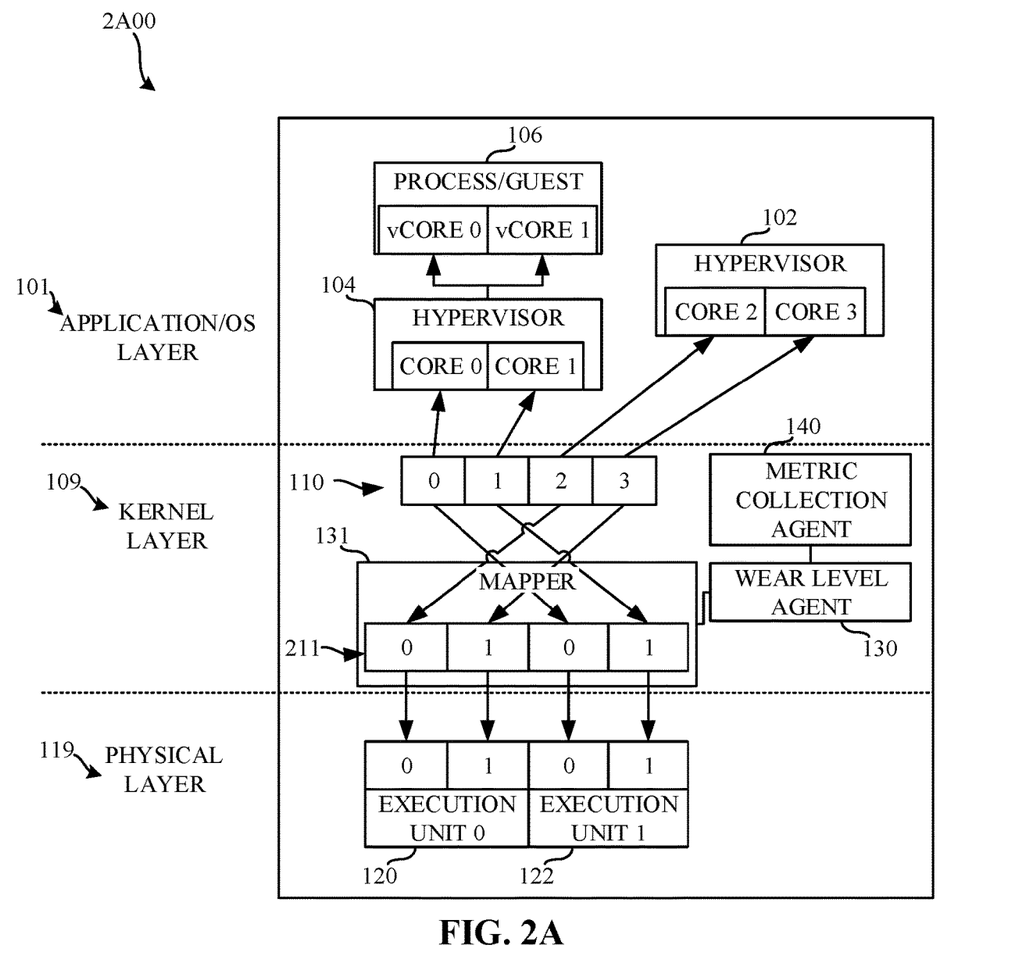
FIG. 2A is an alternative representation of the example block diagram of FIG. 2.

FIG. 2 is a block diagram of an example host system constructed in accordance with teachings of this disclosure. FIG. 2A is an alternative representation of the example block diagram of FIG. 2. In these examples, the wear level agent 130 is implemented at the kernel layer 109 of the host. The wear level agent 130 causes a re-mapping of the physical cores at the kernel view. To facilitate dynamic mapping of the physical cores at the kernel layer 109, the wear level agent 130 is implemented at the kernel layer. In the example of FIG. 2, mapping 211 exists between the logical cores (e.g., as exposed to the applications) and the actual physical cores. The kernel is responsible for taking care of this mapping while still exposing a consistent set of logical cores to the upper layers. In example approaches disclosed herein, CPUID Leaf B considerations have to be taken into account when deciding which approach to take with regards to the physical-logical core mapping, as described below in connection with FIG. 4.

Figure 3:
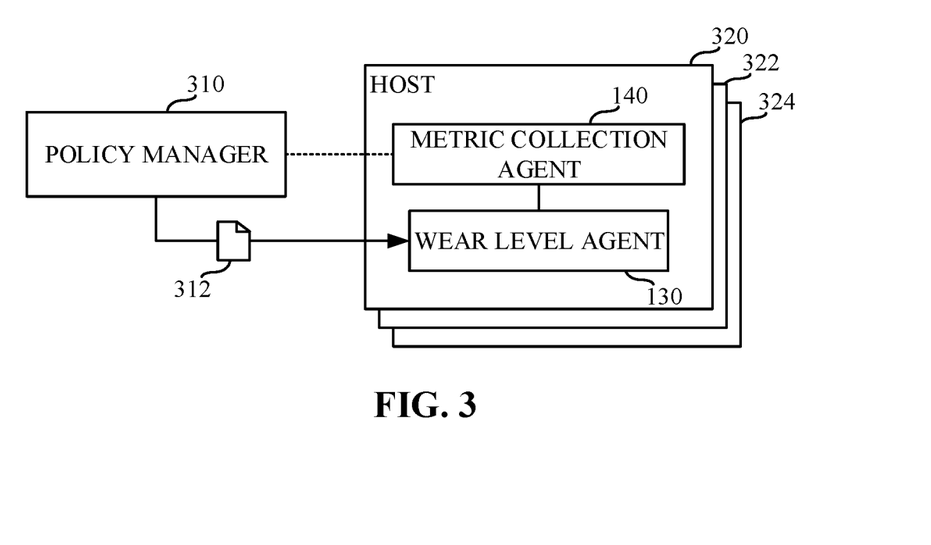
FIG. 3 is a block diagram illustrating an example approach to orchestrating deployment of policies from a policy manager to wear level agent(s) executed at host device(s).

FIG. 3 is a block diagram illustrating an example approach to orchestrating deployment of policies from a policy manager 310 to wear level agent(s) executed at host device(s) 320, 322, 324. In the illustrated example of FIG. 3, the example policy manager 310 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In some examples, the example policy manager is implemented as a server operated in a cloud environment. In some examples, the host(s) may also be implemented in the cloud environment (e.g., as servers and/or as client devices).

In the illustrated example of FIG. 3, the example policy manager 310 provides a policy 312 to the example wear level agent(s) implemented at the various host(s) 320, 322, 324. In the illustrated example of FIG. 3, a same policy is provided to the example host(s) 320, 322, 324. However, in some examples, different policies may be provided to one or more (or even each) of the hosts depending on, for example, the workload expected to be executed at the hosts, the physical characteristics of the host(s), etc.

The wear level agent(s) operate according to their respective policy. In this manner, the policy(ies) provided to the wear level agent may be centrally controlled. Alternatively, the example policy manager 310 may receive information from a given host (e.g., from the metric collection agent 130 of a specific host), and direct the operations of the corresponding wear level agent 130 according to one or more centrally stored policy(ies). However, any other approach to distributing a policy may additionally or alternatively be used.

Figure 4:
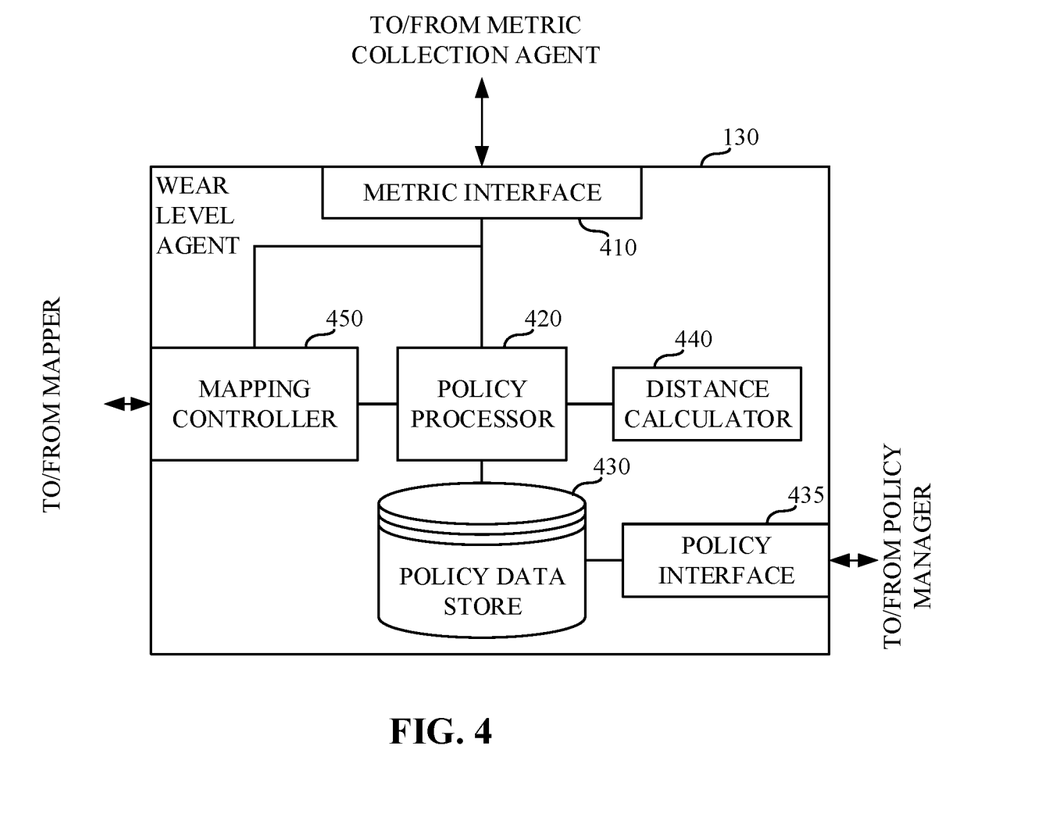
FIG. 4 is a block diagram of an example implementation of the example wear level agent of FIGS. 1 and/or 2.

FIG. 4 is a block diagram of an example implementation of the example wear level agent 130 of FIGS. 1 and/or 2. The example wear level agent 130 of FIG. 4 includes a metric interface 410, a policy processor 420, a policy data store 430, a policy interface 435, a distance calculator 440, and a mapping controller 450.

The example metric interface 410 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In the illustrated example of FIG. 4, the example metric interface 410 interacts with the example metric collection agent 140 to collect CPU metrics (e.g., temperatures).

The example policy processor 420 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example policy processor 420 evaluates the metrics collected by the example metric interface 410 against the policy(ies) stored in the example policy data store 430. The example policy processor 420 determines whether a reconfiguration should occur based on the evaluation of the metrics against the policy(ies). In some examples, the example policy processor 420 determines that a configuration should be allowed after a threshold amount of time has passed (e.g., ten minutes) since a prior reconfiguration. Limiting such re-configurations to only be allowed to occur after a threshold amount of time has passed reduces overhead associated with such re-configuration.

Moreover, the example policy processor 420 determines that the configuration should take place when a metric (e.g., a temperature) has satisfied (e.g., met or exceeded) a threshold value. For example, the policy processor 420 may determine that a CPU core has exceeded a threshold temperature. As a result of such determination, one or more processes executing on that CPU core may be selected for re-allocation to a different CPU core.

After determining that re-mapping should occur, the example policy processor 420 determines a mapping of the processes to a new core based on the policy and the collected metrics. The new mapping may then be validated by the policy processor 420 and/or the example distance calculator 440. If the example mapping does not cause any non-uniform memory architecture (NUMA) distance violations, the mapping may then be applied by the example mapping controller 450. As used herein, non-uniform memory access (NUMA) is a memory design where an amount of time to access memory depends on a location the memory location relative to the processor that is requesting access to the memory. For example, a processor can access local memory faster than non-local memory (e.g., memory local to another processor and/or memory shared between processors). As used herein, a NUMA distance is a measurement of the delay experienced when accessing a particular memory location from a particular processor and/or core. In examples disclosed herein, NUMA distance is measured in time (e.g., nanoseconds). However, any other approach to quantifying an amount of delay, bandwidth, and/or any other type(s) of differences during access experienced by a processor and/or core accessing a memory location may additionally or alternatively be used.

The example policy data store 430 of the illustrated example of FIG. 4 is implemented by any memory, storage device and/or storage disc for storing data such as, for example, flash memory, magnetic media, optical media, etc. Furthermore, the data stored in the policy data store 430 may be in any data format such as, for example, binary data, comma delimited data, tab delimited data, structured query language (SQL) structures, etc. While in the illustrated example the policy data store 430 is illustrated as a single element, the example policy data store 430 and/or any other data storage elements described herein may be implemented by any number and/or type(s) of memories. In the illustrated example of FIG. 4, the policy data store 430 stores policy information received via the policy interface 435. The example policy information is used by the example policy processor 420 to determine, for example, where and/or how to map processes.

The example policy interface 435 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example policy interface 435 enables a policy manager (e.g., see the policy manager 310 of FIG. 3) to provide a policy to the example wear level agent. The example policy interface 435 receives the policy from the policy manager 310 and routes the policy to the policy data store 430 for storage. In some examples, the example policy interface 435 may actively transmit requests to the policy manager 310 to retrieve an updated policy.

The example distance calculator 440 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. As the example policy processor 420 of the example wear level agent 130 remaps processes to cores, applications will move from core to core to alleviate any unwanted heat and/or distribute the heat more evenly in the physical layer. This movement of applications will cause the cache affinity of Mid-Level Cache (MLC) and Last Level Cache (LLC) to be affected, as each core has an MLC and a portion of the LLC. As used herein, cache affinity represents the principal that instructions executed by a processor/ core will have quicker access to memory that is local to that processor/core, as opposed to memory that is far away from that processor/core. In examples disclosed herein, Last Level Cache (LLC) refers to a cache (e.g., memory) that is shared among multiple components (e.g., cores, execution units, etc.) of a hardware processor (e.g., hardware processor 117 of FIGS. 1 and/or 2). In examples disclosed herein, Mid-Level Cache refers to a cache (e.g., memory) that is local to a particular component (e.g., a core, an execution unit, etc.) of a hardware processor.

To reduce the effect of this on application latency, a non-uniform memory architecture (NUMA) distance threshold is used to facilitate re-mapping to cores within a specified distance. As noted above, a NUMA distance is a measurement of the delay experienced when accessing a particular memory location from a particular processor and/or core. In some examples, the distance is within a sub-NUMA cluster, a NUMA node, or within N NUMA node hops. Such an approach ensures that applications that require low-latency are kept local to the memory they have an affinity with, thereby reducing latency for memory operations.

As used herein, a NUMA node refers to memory that is local to a particular processor. N NUMA node hops refers to access of memory from a separate processor/core than the processor/core executing an instruction. As used herein, a sub-NUMA cluster (SNC) creates two or more localization domains within a processor by mapping addresses from one of the local memory controllers in a portion of the LLC closer to that memory controller and addresses mapped to the another memory controller(s) into the LLC in the other portion(s). Through this address-mapping mechanism, processes running on cores on one of the SNC domains using memory from the memory controller in the same SNC domain observe lower LLC and memory latency compared to latency on accesses mapped to locations outside of the same SNC domain.

By controlling the NUMA distance threshold (perhaps by editing the policy at the device itself or by editing a policy to be distributed by the policy manager 310 of FIG. 3), a user (e.g., an administrator) can configure the system for their needs (e.g., a desired minimum memory latency). For example, if a user were managing a system that operates an application requiring low memory latency, the user can select a NUMA distance threshold such that re-mapping of cores is limited to cores within a sub-NUMA cluster. Limiting reassignment in this manner reduces the benefit of spreading the resultant heat because the process is only allowed to be moved over a smaller distance.

In examples disclosed herein, there are multiple options for reducing memory latency impacts due to the wear leveling policy. One example is to re-affinitize the memory of an application to the memory space managed by the memory controller closest to the core the application is now running on. That is, once a process is moved from a first processor/core to a second processor/core, memory values associated with that process can be moved to memory that is local to the second processor/core. As copying the memory values to the memory that is local to the second processor/core is a time-consuming operation, the frequency at which the wear level policy is applied could be lowered to counteract the overhead of this memory move operation.

The example mapping controller 450 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc.

In examples disclosed herein, the example mapping controller 450 gathers information concerning the topology of cores of the processor and/or execution units 120, 122. In examples disclosed herein, the example mapping controller 450 issues a CPUID instruction to the processor. As used herein, the CPUID opcode is a processor supplementary instruction for a processor (e.g., a processor implemented using an x86 architecture) that enables software to discover details (e.g., a topology) of the processor. In examples disclosed herein, a LEAF B feature of the CPUID instruction is used to determine the processor/memory topology of the processor and/or the execution units 120, 122. In some examples, the example mapping controller 450 interacts with a host OS to issue the CPUID instruction to determine the processor CPU/memory topology.

In examples where the mapping is implemented at a hardware level (e.g., FIG. 1), after remapping, the results returned from the execution of the CPUID instruction using the LEAF B feature will show a same enumeration of cores to their logical location than prior to the remapping. However, if logical core 1 went from being mapped to physical core 1 to being mapped to physical core 2, and each physical core has 2 threads, then both of logical core 1's threads (e.g., as reported by the LEAF B feature) would no longer (both) be from physical core 1, but would actually be from physical core 2. That is, CPU thread pairings would be expected to remain consistent because the mapping of the logical core to the physical core is changed, not the mapping of the thread/process to the logical core. In some examples, the kernel and/or host OS updates the relevant mapping tables. In some examples, mapping is performed at the process/thread level.

In examples where the mapping is implemented at the kernel layer (e.g., FIG. 2), after remapping, the relevant host OS tables are modified by the example mapping controller 450 and/or are supplemented with an intermediary mapping table (e.g., the mapper 131 of FIG. 2) to capture the actual CPU topology. In this manner, the remapped presentation of the new topology would remain in the current table entries. Kernel routines for mapping process affinity to CPU enumerations would then not need to be updated to leverage the remapped presentation. In some examples, file and/or memory locks (e.g., Read-Copy-Update locks) may be used to protect the consistency of the tables.

If, for example, an application required software threads to be co-located on CPUs within a socket or if an even more precise allocation software threads to physical execution units is required this can be configured via the kernel routines on the host or via the orchestration environments.

As the remapping happens below the OS kernel interface level there is no additional reconfiguration needed for threads that have been configured within a logical grouping of affinities. The pairing of logical (hyperthreaded) cores to the kernels interface presentation of the physical execution unit is unchanged. However, the kernel is updated to understand that there is an additional level of redirect.

While an example manner of implementing the example wear level agent 130 of FIGS. 1 and/or 2 is illustrated in FIG. 4, one or more of the elements, processes and/or devices illustrated in FIG. 4 may be combined, divided, re-arranged, omitted, eliminated and/or implemented in any other way. Further, the example metric interface 410, the example policy processor 420, the example policy data store 430, the example policy interface 435, the example distance calculator 440, the example mapping controller 450, and/or, more generally, the example wear level agent 130 of FIGS. 1, 2, and/or 4, and/or the example metric collection agent 140 of FIGS. 1 and/or 2 may be implemented by hardware, software, firmware and/or any combination of hardware, software and/or firmware. Thus, for example, any of the example metric interface 410, the example policy processor 420, the example policy data store 430, the example policy interface 435, the example distance calculator 440, the example mapping controller 450, and/or, more generally, the example wear level agent 130 of FIGS. 1, 2, and/or 4, and/or the example metric collection agent 140 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example metric interface 410, the example policy processor 420, the example policy data store 430, the example policy interface 435, the example distance calculator 440, the example mapping controller 450, and/or, more generally, the example wear level agent 130 of FIGS. 1, 2, and/or 4, and/or the example metric collection agent 140 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example wear level agent 130 of FIGS. 1, 2, and/or 4, and/or the example metric collection agent 140 of FIGS. 1 and/or 2 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
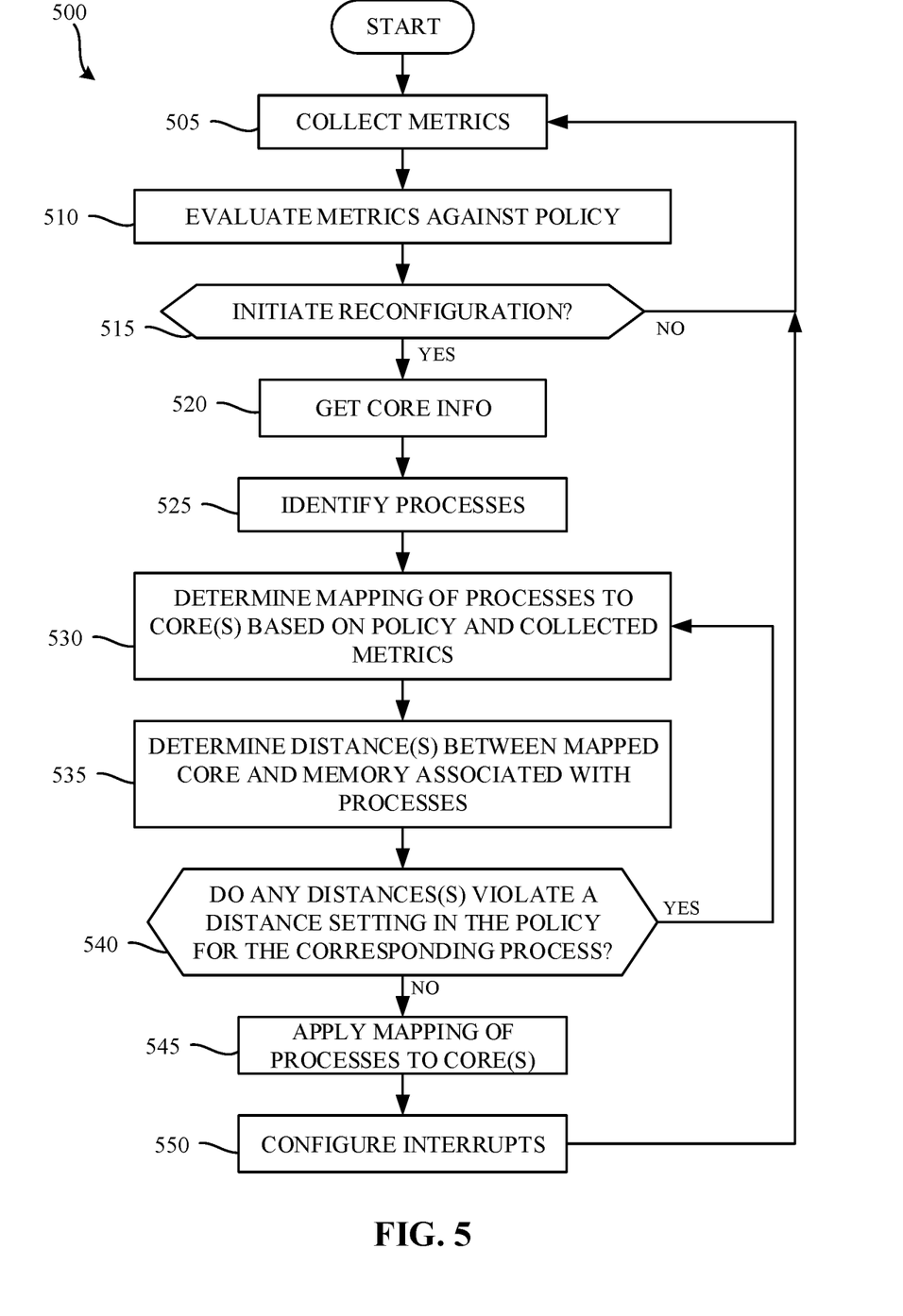
FIG. 5 is a flowchart representative of example machine readable instructions that, when executed, cause the example wear level agent to manage CPU hotspots.

A flowchart representative of example hardware logic, machine readable instructions, hardware implemented state machines, and/or any combination thereof for implementing the example wear level agent 130 FIGS. 1, 2, and/or 4 is shown in FIG. 5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example wear level agent 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 5 is a flowchart representative of example machine readable instructions 500 that, when executed, cause the example wear level agent 130 to manage CPU hotspots. The example process 500 of the illustrated example of FIG. 5 begin when the example metric interface 410 collects metrics via the example metric collection agent 140. (Block 505). In examples disclosed herein, the metrics represent temperature readings at each of the cores of the physical hardware (e.g., the cores of the execution units 120, 122).

The example policy processor 420 then evaluates the collected metrics against the policy stored in the example policy data store 430. (Block 510). The example policy processor 420 determines whether a reconfiguration should occur based on the evaluation of the metrics against the policy. (Block 515). In some examples, the example policy processor 420 determines that a configuration should be allowed after a threshold amount of time has passed (e.g., ten minutes) since a prior reconfiguration. Ensuring that such re-configurations are only allowed to occur after a threshold amount of time has passed ensures that overhead associated with such re-configuration is kept to a minimum. Moreover, the example policy processor 420 determines that the configuration should take place when a metric (e.g., a temperature) has met or exceeded a threshold value. For example, the policy processor 420 may determine that a CPU core has exceeded a threshold temperature. As a result of such determination, one or more processes executing on that CPU core may be selected for re-allocation to a different CPU core.

The example mapping controller 450 then gathers info concerning the cores of the processor and/or execution units

120, 122. (Block 520). In examples disclosed herein, the example mapping controller 450 uses a LEAF B mechanism to determine the processor/memory topology of the processor and/or the execution units 120, 122. However, any other approach to gathering information concerning the cores of the processor may additionally or alternatively be used. The example policy processor 420 identifies processes to be remapped. (Block 525). In examples disclosed herein, the processes are selected based on the core on which they are running and/or the temperature of the core.

The example policy processor 420 then determines a mapping of the processes to a new core based on the policy and the collected metrics. (Block 530). Using the new mapping, the example distance calculator 440 determines distance(s) between the existing location of the processes (e.g., for memory purposes), and the newly mapped location of the processes. (Block 535). The example policy processor 420 determines whether any of the determined distances violated distance setting for the corresponding process. (Block 540). In the illustrated example of FIG. 5, only the location at which the instructions associated with those processes to be moved is changed, and any cache and/or register locations are not moved as part of the remapping. In some examples, a process may require low latency access to the memory that will be accessing. In such an example, such process should only be allowed to be moved a small distance from its memory location (e.g., to another core within a same execution unit). Thus, for example, the process should not be moved from one execution unit to another. In some alternative examples, memory may additionally be moved to the new location at which the processes to be executed. However, such moving in or copying of memory values may incur significant overhead.

If any of the distances violate a distance setting in the policy for the corresponding process (e.g., block 540 returns a result of YES), control proceeds to block 530 where the example policy processor 420 determines an alternative mapping of the processes. Control proceeds until block 540 returns a result of NO. In some examples, no alternative mappings may satisfy the distance requirements, in which case the attempted remapping may be aborted.

If none of the distances violate the distance setting in the policy for the corresponding process (e.g., block 540 returns a result of NO), the example mapping controller 450 applies the selected mapping of processes to the cores. (Block 545). The example mapping controller 450 then interacts with interrupt pinning logic of the kernel layer 109 and/or physical layer 119 to ensure that any interrupts are also remapped. (Block 550). Control proceeds to block 505, where the example metric interface 410 collects metrics via the example metric collection agent 140. In some examples, the policy processor 420 may additionally determine that the policy interface 435 should attempt to gather an updated policy (e.g., in response to determining that a threshold amount of time has passed since a prior attempt to gather the updated policy.) The example process 500 of FIG. 5 is then continually repeated, but may be terminated at any given time.

Figure 6:
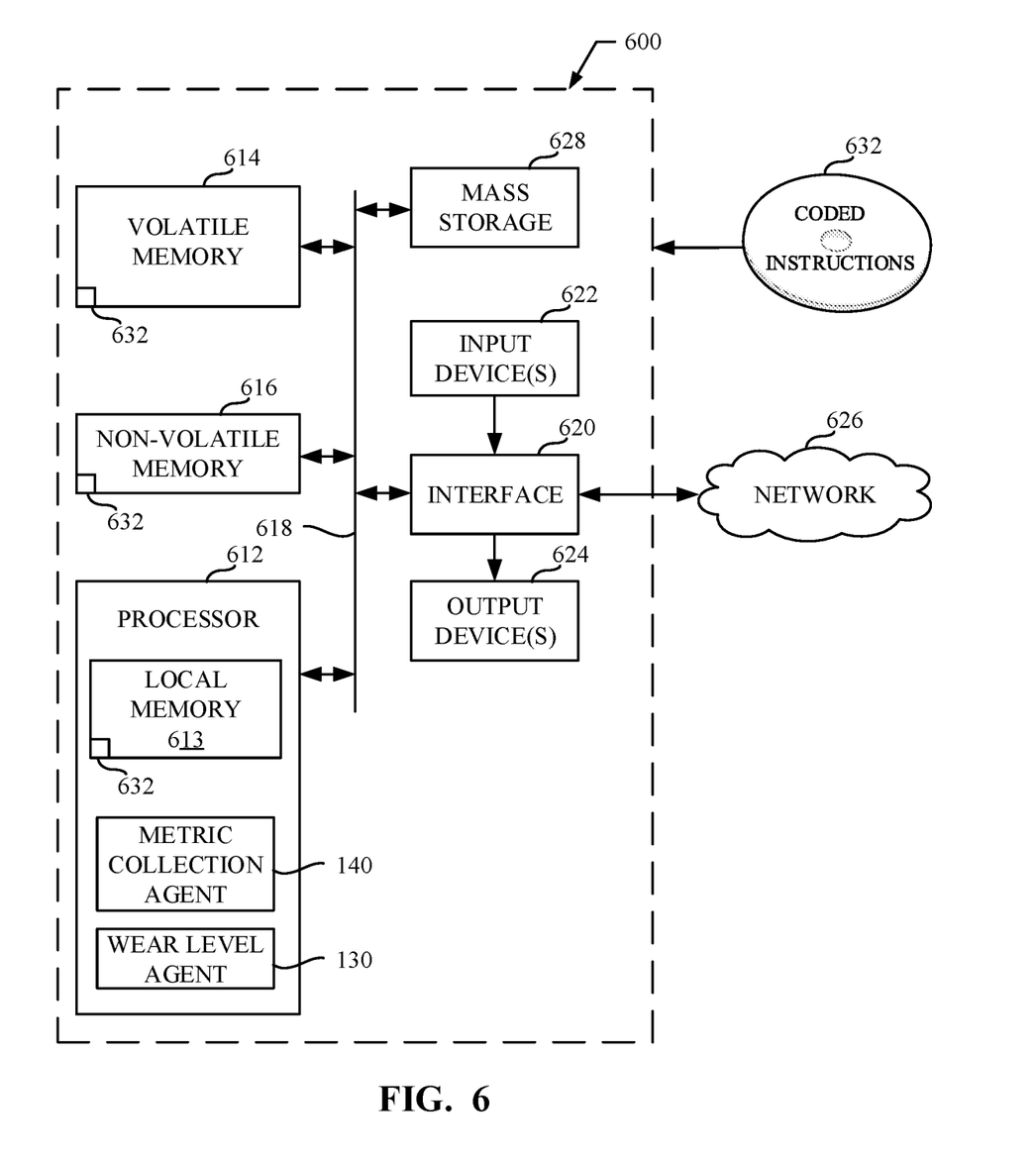
FIG. 6 is a block diagram of an example processor platform structured to execute the instructions of FIG. 5 to implement the wear level agent of FIGS. 1, 2, and/or 4.

FIG. 6 is a block diagram of an example processor platform 600 structured to execute the instructions of FIG. 5 to implement the wear level agent 130 of FIGS. 1, 2, and/or 4. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example metric collection agent 140 and the example wear level agent 130. However, in some examples, the example metric collection agent 140 and/or the example wear level agent 130 may be implemented separately from the processor 612 and may communicate with the processor 612 via the bus 618.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices

628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus, and articles of manufacture have been disclosed that enable efficient dynamic remapping of processes to processor cores. As a result of the dynamic mapping, CPU cooling can be performed more efficiently. For example, power levels for heatsink fan systems can be reduced as a result of the decreased amount of cooling needed. Moreover, noise levels in data centers can be reduced due to the lessened cooling needs. In the context of fan-less applications, heat dissipation can be performed more efficiently which, in turn, reduces the chances of unexpected hardware failures (e.g., due to uneven workload distribution across the CPU cores).

Example 1 includes an apparatus to manage heat in a central processing unit (CPU), the apparatus comprising a metric collection agent to output a metric representative of a property of the central processor unit including a first core and a second physical core, the first physical core and the second physical core mapped to first and second logical cores by a map, a policy processor to evaluate the first metric to determine whether to change the map to remap at least one of the first and second logical cores relative to the second one of the first and the second physical cores to move a process between the first and second physical cores to adjust the property, the moving of the process between the physical cores being transparent to an application/OS layer, and a mapping controller responsive to the policy processor to change the map.

Example 2 includes the apparatus of example 1, wherein the policy processor is implemented at a physical layer.

Example 3 includes the apparatus of example 1, wherein the policy processor is implemented at a kernel layer.

Example 4 includes the apparatus of example 1, wherein the metric collection agent is implemented at a physical layer.

Example 5 includes the apparatus of example 1, wherein the metric collection agent is implemented at a kernel layer.

Example 6 includes the apparatus of example 1, wherein the process is instantiated on a hypervisor executed at the application/OS layer.

Example 7 includes the apparatus of example 1, wherein the process is instantiated in the application/OS layer.

Example 8 includes the apparatus of any one of examples 1 through 7, wherein the metric is a temperature of the first core of the processor.

Example 9 includes the apparatus of example 8, wherein a policy defines a threshold temperature for the first core, and the policy processor is to determine whether to initiate the remapping by comparing the temperature of the first core to the threshold temperature, and initiating the remapping when the temperature of the first core satisfies the threshold temperature.

Example 10 includes the apparatus of example 9, further including a policy interface to access an updated policy from a policy manager.

Example 11 includes the apparatus of example 10, wherein the policy manager is implemented by a server.

Example 12 includes the apparatus of example 9, wherein the policy further identifies a frequency at which remapping of the process may occur.

Example 13 includes the apparatus of any one of examples 1 through 12, further including a distance calculator to calculate a non-uniform memory architecture distance between the second core and memory associated with the process, and the policy processor is to determine whether the distance satisfies a distance threshold defined in the policy for the process, the policy processor to, in response to determining that the distance does not satisfy the distance threshold, revise the updated mapping to map the at least one of the first and second logical cores to a third physical core, a second distance between the third physical core and the memory associated with the process being less than the distance threshold.

Example 14 includes a computing system comprising a central processing unit including a first physical core and a second physical core, a kernel layer including a first logical core and a second logical core, a mapper to dynamically map the first logical core to a first one of the first physical core and the second physical core, and to map the second logical to a second one of the first physical core and the second physical core, and a wear level agent to control the mapper to remap the first logical core to the second one of the first physical core and the second physical core, and to remap the second logical to the first one of the first physical core and the second physical core based on heat detected in at least one of the first physical core and the second physical core, the remapping of the first and second logical cores being transparent to a process associated with the heat.

Example 15 includes the system of example 14, wherein the wear level agent is implemented at a physical layer.

Example 16 includes the system of example 14, wherein the wear level agent is implemented at the kernel layer.

Example 17 includes the system of example 14, wherein the process is instantiated on a hypervisor executed at an application/OS layer.

Example 18 includes the system of example 14, wherein the process is instantiated in an application/OS layer.

Example 19 includes at least one non-transitory machine readable medium comprising instructions which, when executed by at least one processor, cause the at least one processor to at least access a first metric representing a property of a first core of a processor of a host, evaluate the first metric against a policy to determine whether to initiate remapping of a process executed at the first physical core to a second physical core, in response to determining that the process remapping should be initiated determine an updated mapping to map the process to the second core of the processor, and apply the updated mapping.

Example 20 includes the at least one non-transitory machine readable medium of example 19, wherein the first metric is a temperature of the first core of the processor.

Example 21 includes the at least one non-transitory machine readable medium of example 20, wherein the policy defines a threshold temperature for the first core, and the instructions, when executed, cause the at least one processor to determine whether to initiate the remapping by at least comparing the temperature of the first core to the threshold temperature, and initiating the remapping when the temperature of the first core meets or exceeds the threshold temperature.

Example 22 includes the at least one non-transitory machine readable medium of example 19, wherein the instructions, when executed, further cause the at least one processor to access an updated policy from a policy manager.

Example 23 includes the at least one non-transitory machine readable medium of example 19, wherein the instructions, when executed, further cause the at least one processor to, in response to the determining of the updated mapping, at least calculate a non-uniform memory architecture distance between the second physical core and memory associated with the process, determine whether the distance satisfies a distance threshold defined in the policy for the process, and in response to determining that the distance does not satisfy the distance threshold, revise the updated mapping to map the process to a third core, a second distance between the third core and the memory associated with the process being less than the distance threshold defined in the policy for the process.

Example 24 includes a method to manage heat in a central processing unit (CPU), the method comprising accessing a first metric representing a property of a first core of a processor of a host, evaluating the first metric against a policy to determine whether to initiate remapping of a process executed at the first physical core to a second physical core, in response to determining that the process remapping should be initiated determining an updated mapping to map the process to the second core of the processor, and applying the updated mapping.

Example 25 includes the method of example 24, wherein the first metric is a temperature of the first core of the processor.

Example 26 includes the method of example 25, wherein the policy defines a threshold temperature for the first core, further including determining whether to initiate the remapping by at least comparing the temperature of the first core to the threshold temperature, and initiating the remapping when the temperature of the first core meets or exceeds the threshold temperature.

Example 27 includes the method of example 24, further including accessing an updated policy from a policy manager.

Example 28 includes the method of example 24, further including, in response to the determining of the updated mapping calculating a non-uniform memory architecture distance between the second physical core and memory associated with the process, determining whether the distance satisfies a distance threshold defined in the policy for the process, and in response to determining that the distance does not satisfy the distance threshold, revising the updated mapping to map the process to a third core, a second distance between the third core and the memory associated with the process being less than the distance threshold defined in the policy for the process.

Example 29 includes an apparatus to manage heat in a central processing unit (CPU), the apparatus comprising means for outputting a metric representative of a property of the central processor unit including a first core and a second physical core, the first physical core and the second physical core mapped to first and second logical cores by a map, means for evaluating the first metric to determine whether to change the map to remap at least one of the first and second logical cores relative to the second one of the first and second physical cores to move a process between the first and second physical cores to adjust the property, the moving of the process between the physical cores being transparent to an application/OS layer, and means for controlling, responsive to the policy processor, the map.

Example 30 includes the apparatus of example 29, wherein the means for evaluating is implemented at a physical layer.

Example 31 includes the apparatus of example 29, wherein the means for evaluating is implemented at a kernel layer.

Example 32 includes the apparatus of example 29, wherein the means for outputting is implemented at a physical layer.

Example 33 includes the apparatus of example 29, wherein the means for outputting is implemented at a kernel layer.

Example 34 includes the apparatus of example 29, wherein the process is instantiated on a hypervisor executed at the application/OS layer.

Example 35 includes the apparatus of example 29, wherein the process is instantiated in the application/OS layer.

Example 36 includes the apparatus of any one of examples 29 through 35, wherein the metric is a temperature of the first core of the processor.

Example 37 includes the apparatus of example 36, wherein a policy defines a threshold temperature for the first core, and the means for evaluating is to determine whether to initiate the remapping by comparing the temperature of the first core to the threshold temperature, the means for evaluating to initiate the remapping when the temperature of the first core satisfies the threshold temperature.

Example 38 includes the apparatus of example 37, further including a means for accessing an updated policy from a policy manager.

Example 39 includes the apparatus of example 38, wherein the policy manager is implemented by a server.

Example 40 includes the apparatus of example 38, wherein the policy further identifies a frequency at which remapping of the process may occur.

Example 41 includes the apparatus of any one of examples 29 through 40, further including means for calculating a non-uniform memory architecture distance between the second core and memory associated with the process, and the means for evaluating is to determine whether the distance satisfies a distance threshold defined in the policy for the process, the means for evaluating to, in response to determining that the distance does not satisfy the distance threshold, revise the updated mapping to map the at least one of the first and second logical cores to a third physical core, a second distance between the third physical core and the memory associated with the process being less than the distance threshold. Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage heat in a central processing unit (CPU), the apparatus comprising:
   memory; and
   at least one processor configured to implement:
   a metric interface to collect a first metric representative of a property of the central processor unit from a metric collection agent, the central processing unit including a first physical core and a second physical core, the first physical core and the second physical core mapped to first and second logical cores by a map;
   a policy processor to evaluate the first metric to determine whether to create an updated mapping to remap at least one of the first and second logical cores relative to the first and the second physical cores to move a process between the first and second physical cores to adjust the property, the moving of the process between the first and second physical cores being transparent to an application/OS layer;

a distance calculator to calculate a non-uniform memory architecture distance between the first or second physical core and a memory associated with the process, wherein the policy processor is to determine whether the distance satisfies a distance threshold defined in a policy, the policy processor to, in response to determining that the distance does not satisfy the distance threshold, revise the updated mapping to map the at least one of the first and second logical cores to a third physical core, a second distance between the third physical core and the memory associated with the process being less than the distance threshold; and a mapping controller responsive to the policy processor to apply the updated mapping.

2. The apparatus of claim 1, wherein the policy processor is implemented at a kernel layer.

3. The apparatus of claim 1, wherein the metric collection agent is implemented at a kernel layer.

4. The apparatus of claim 1, wherein the process is instantiated on a hypervisor executed at the application/OS layer.

5. The apparatus of claim 1, wherein the process is instantiated in the application/OS layer.

6. The apparatus of claim 1, wherein the metric is a temperature of the first core of the processor.

7. The apparatus of claim 6, wherein the policy defines a threshold temperature for the first physical core, and the policy processor is to determine whether to initiate a remapping by comparing the temperature of the first physical core to the threshold temperature, and initiating the remapping when the temperature of the first physical core satisfies the threshold temperature.

8. The apparatus of claim 7, further including a policy interface to access an updated policy from a policy manager.

9. The apparatus of claim 8, wherein the policy manager is implemented by a server.

10. The apparatus of claim 7, wherein the policy further identifies a frequency at which the remapping may occur.

11. A computing system comprising:
a central processing unit including a first physical core, a second physical core, and a third physical core;
a kernel layer including a first logical core and a second logical core;
memory including a mapping table to dynamically map the first logical core to a first one of the first physical core and the second physical core, and to map the second logical core to a second one of the first physical core and the second physical core; and
a wear level agent implemented by a processor configured to:
remap the first logical core to the second one of the first physical core and the second physical core;
remap the second logical core to the first one of the first physical core and the second physical core based on heat detected in at least one of the first physical core and the second physical core, the remapping of the first and second logical cores being transparent to a process associated with the heat;
calculate a non-uniform memory architecture distance between the second physical core and a memory associated with the process;
in response to determining that the distance does not satisfy a distance threshold defined in a policy, revise the mapping table to map at least one of the first and second logical cores to the third physical core, a second distance between the third physical core and the memory associated with the process being less than the distance threshold; and
apply the mapping table.

12. The system of claim 11, wherein the wear level agent is implemented at the kernel layer.

13. The system of claim 11, wherein the process is instantiated on a hypervisor executed at an application/OS layer.

14. The system of claim 11, wherein the process is instantiated in an application/OS layer.

15. At least one non-transitory machine readable medium comprising instructions which, when executed by at least one processor, cause the at least one processor to at least:
access a first metric representing a property of a first physical core of a processor of a host;
evaluate the first metric against a policy to determine whether to initiate a remapping of a process executed at the first physical core to a second physical core;
in response to determining that the process remapping should be initiated:
determine an updated mapping to map the process to the second physical core of the processor;
calculate a non-uniform memory architecture distance between the second physical core and a memory associated with the process;
determine whether the distance satisfies a distance threshold defined in the policy;
in response to determining that the distance does not satisfy the distance threshold, revise the updated mapping to map the process to a third physical core, a second distance between the third physical core and the memory associated with the process being less than the distance threshold defined in the policy; and
apply the updated mapping.

16. The at least one non-transitory machine readable medium of claim 15, wherein the first metric is a temperature of the first physical core of the processor.

17. The at least one non-transitory machine readable medium of claim 16, wherein the policy defines a threshold temperature for the first physical core, and the instructions, when executed, cause the at least one processor to determine whether to initiate the remapping by at least:
comparing the temperature of the first physical core to the threshold temperature; and
initiating the remapping when the temperature of the first physical core meets or exceeds the threshold temperature.

18. The at least one non-transitory machine readable medium of claim 15, wherein the instructions, when executed, further cause the at least one processor to access an updated policy from a policy manager.

* * * * *